United States Patent [19]

Langberg

[11] 4,038,609
[45] July 26, 1977

[54] REPLICA BRIDGE SENSING CIRCUIT

[76] Inventor: Edwin Langberg, 33 Manning Lane, Cherry Hill, N.J. 08003

[21] Appl. No.: 706,605

[22] Filed: July 19, 1976

[51] Int. Cl.² .................... G01D 21/04; G01R 33/00; G01V 3/10
[52] U.S. Cl. ........................................ 331/65; 324/41; 324/DIG. 1; 331/110; 331/138; 331/175; 331/183; 340/258 C; 340/285
[58] Field of Search ............... 331/65, 66, 108 D, 110, 331/138, 140–142, 175, 183; 324/41, DIG. 1; 340/258 C, 285

[56] References Cited

U.S. PATENT DOCUMENTS

| | | | |
|---|---|---|---|
| 2,711,510 | 6/1955 | Tricebock | 324/41 |
| 3,151,487 | 10/1964 | Schuck | 331/65 X |

Primary Examiner—Siegfried H. Grimm
Attorney, Agent, or Firm—Pennie & Edmonds

[57] ABSTRACT

A replica bridge sensing circuit, comprising an amplifier having inverting and non-inverting inputs, which are symmetrically connected to a generator through a bridge circuit that has replica elements in corresponding branches. Replica elements are defined as circuit components which because of identity of the manufacturing process, are nearly identical both physically and electrically. A nearly balanced replica bridge, so connected, between the input and the output of such an amplifier forms a Replica Bridge Oscillator (RBO) circuit. Non-linear elements are included in the oscillator circuit to stabilize the amplifier output amplitude and the phase angles between the inputs and output. Replica Bridge Oscillator operation is substantially immune to changes in environmental conditions and to changes in the power supply voltages. With replica sensor elements used in corresponding branches, the Replica Bridge Oscillator is a sensing circuit particularly well adapted for use in detection of small sensor impedance variations. When utilized for metal detection, such a sensing circuit exhibits improved sensitivity and stability over existing detection circuits and is particularly adapted for multiaxial operation.

14 Claims, 11 Drawing Figures

REPLICA BRIDGE SENSING CIRCUIT

BACKGROUND OF THE INVENTION

1. Field of the Invention

This invention relates to oscillators of the bridge type and more particularly relates to the use of such oscillators as part of apparatus for detecting metal particles, detecting the proximity of objects, detecting temperature changes and the like.

The specific embodiment of the invention discloses an apparatus for sensing undesired metal particles which frequently become included in products during the manufacturing process. Such particles are referred to as tramp metal particles or simply tramp metal, and apparatus for detecting the presence of such particles are frequently called tramp metal detectors. These detectors usually include an oscillator circuit.

2. Description of the Prior Art

Many oscillators employing positive and negative feedback in an amplifier circuit are known in the art including oscillators that employ a bridge circuit as part of the feedback network. Examples of such oscillators are the Meacham bridge type described in U.S. Pat. No. 2,163,403 and the Wien bridge type as described for example in "Vacuum Tube Oscillators" by William A. Edson at pp. 138–142, John Wiley & Sons, Inc., N.Y. 1953. Such oscillators have been employed as part of a proximity detection apparatus as is described for example in U.S. Pat. No. 3,870,948. When used in such apparatus, the oscillators of the prior art necessitate the use of complex and expensive techniques to ensure stable detection sensitivity over variations in environmental conditions such as temperature, humidity, vibration, etc. which are not required by the oscillator of the present invention.

A common tramp metal detection apparatus is a Balanced Coils Metal Detector that consists of a center drive coil connected to an oscillator circuit and two search coils, one placed on each side of the drive coil. The search coils are carefully balanced and connected in opposition so as to obtain zero output signal. In order for a balanced coils metal detector to achieve a satisfactory sensitivity continuous balancing of the search coils utilizing complex added circuitry and frequent manual resetting of balance controls is required. Maintaining adequate and stable sensitivity of this circuit in the typical industrial plant environment requires almost continuous operator attention.

An additional disadvantage of the balanced coils metal detector is the fact that in practical applications it is limited to a geometry which produces a magnetic search field in a single direction. Problems of mutual interaction and the resulting complexity of stabilization circuitry makes multiaxial systems based on the balanced coil detector impractical.

Another prior art metal detector known as a Tuned Search Coil Detector uses a single search coil as the tank coil of a conventional oscillator circuit. The operation of this detector is based on the fact that the Q of the coil is changed by the presence of a metallic object. The change in Q changes the output amplitude of the resonance circuit oscillator and is utilized to indicate the presence of a metallic object. Metal detectors based on the Tuned Search Coil principle also require manual adjustment of the oscillator tank circuit and have a sensitivity which is even less than that achieved by Balanced Coils Metal Detectors.

SUMMARY OF THE INVENTION

The invention is a replica bridge sensing circuit comprising an amplifier having inverting and non-inverting inputs connected to two nodes of a bridge circuit with replica element branches and the remaining two nodes connected to an alternating current source. Replica elements are defined as circuit components that have substantially identical electro-physical characteristics achieved through the use of identical materials and methods in their manufacture. A replica bridge sensing circuit has, among others, replica sensor elements in corresponding branches. A sensor element responds to the sensed phenomenon by modification of its electrical properties. The preferred replica bridge sensing circuit is a Replica Bridge Oscillator (RBO) circuit with a nearly balanced element replica bridge connected between the input and the output of the amplifier providing symmetrical positive and negative feedback loops to the respective inputs of the amplifier thereby supplying alternating current at the amplifier output. The complete Replica Bridge Oscillator includes further compensatory elements and nonlinear elements, the latter being used to stabilize the amplitude of oscillations and the phase relationship between the inputs and the output. Replica sensor elements are included in corresponding branches of the bridge circuit to provide a Replica Bridge Oscillator sensing circuit exhibiting a high degree of sensitivity to sensor impedance variation combined with immunity to variations in environmental and operational conditions.

Stability and sensitivity is particularly important for oscillators used in a metal detecting apparatus that is employed as a part of quality control apparatus, for example in pharmaceutical and food processing industry, and is achieved in the oscillator of the present invention inherently without the need for complex and expensive additional circuits.

The use of replica sensor coils in the Replica Bridge Oscillator circuit of the present invention provides a metal detector having high sensitivity and stability, without the need for additional complex balance circuitry and that requires virtually no manual adjustment. A detector based on the RBO of the present invention is not limited to a magnetic search field in a single direction because the sensor coils do not have to be balanced with respect to a drive coil and in fact coupling between pairs of replica coils associated with separate RBO circuits is used to advantage. Hence magnetic search fields in three orthogonal directions are easily achieved in tramp metal detectors using RBO's.

Detectors utilizing the RBO of the present invention, in contrast to the prior art Balanced Coils Metal Detectors, exhibit much higher detection sensitivity than either of the prior art detectors and are much more immune to temperature, humidity, vibration and other environmental factors as well as to changes in oscillator operational conditions, e.g. supply voltages. Furthermore, detectors using RBO's can use search coils wound on ferro-magnetic cores as sensing elements, in spite of non-linearity of such cores, thereby permitting compact multiaxial search head design and providing much improved immunity to externally induced noise and to stray magnetic fields.

In accordance with the preferred embodiment of the invention two Replica Bridge Oscillators having substantially identical front and rear inductor assemblies in corresponding branches of each respective replica bridge network are utilized in an apparatus for the detection of tramp metal particles in a non-metallic medium. The coils are arranged to provide magnetic search fields in three mutually perpendicular directions in the path of travel of the metal particle. The RBO phase relationship is automatically stabilized and the output amplitude of each oscillator is automatically maintained at a predetermined reference level by nonlinear elements in the feedback loops.

The output signal from the RBO, indicating the detection of tramp metal in a non-metallic object, in accordance with the preferred embodiment, is obtained from the amplitude control signal. Tramp metal changes the attenuation of the Replica Bridge which disturbs the RBO equilibrium amplitude, this disturbance is sensed by a peak detector in the Amplitude Control circuit and control signal is used to bring the amplitude back to equilibrium and as an output. This control signal change follows even a very small imbalance in the two RBO replica sensor coils and yet it is immune to environmental and operational changes effecting both coils. The signal-to-noise ratio and reliability of detection of tramp metal is therefore excellent.

Additional improvement of the signal-to-noise of the output signal is obtained by frequency band-pass filtering of the metal detection output signal from the RBO. Signal-to-noise optimization is further refined by monitoring the motion of the non-metallic product through the search head and time-correlating the motion with the signal corresponding to tramp metal detection.

DESCRIPTION OF THE DRAWINGS

The invention is fully described with reference to the annexed drawings, in which.

DETAILED DESCRIPTION OF THE PREFERRED EMBODIMENT

The oscillator of this invention uses a bridge network which, in general, is defined as a network with two ports (or terminal node pairs) capable of being operated in such a manner that when power is fed into one port, by suitable adjustment of the elements of branches connected between ports, zero output can be obtained at the other port. Under these conditions the bridge is balanced.

Figure 1:
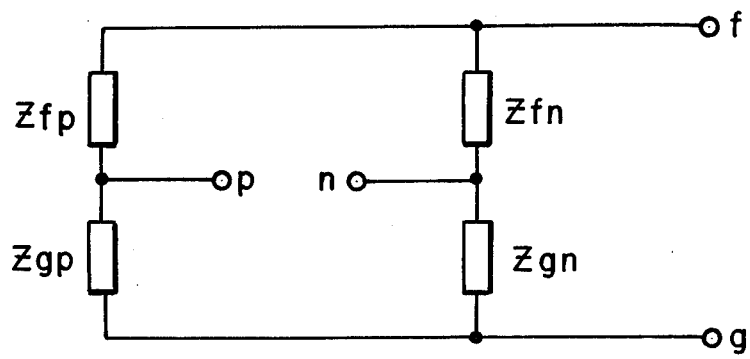
FIG. 1 illustrates a generalized bridge circuit configuration.

Referring to FIG. 1, a bridge network, with ports $pn$ and $fg$ and branches designated by subscripts indicating their respective terminal connections, is shown. It may be assumed that power is applied at the port $fg$ and that the $g$ terminal is grounded, and further that voltage is measured between terminals $pn$.

The condition of bridge balance is that the products of the branch impedance must be equal:

$$Z_{fp} Z_{gn} = Z_{fn} Z_{gp} \qquad (1)$$

For the purpose of this description bridges are divided into two categories, namely Replica element bridges and Common element bridges.

Replica elements are circuit components defined in terms of the tolerance and tracking error of their properties.

The tolerance of an electronic circuit element is defined as a maximum permissible deviation from a specified value at specified conditions. For example, a 100 ohm resistor with 5% tolerance, rated at ¼ watt power dissipation, in the temperature range of 0° C to 50° C. and in the frequency range of 0 to 10 MHz, will be within the range of 95 ohms to 105 ohms provided that neither the power dissipation, nor temperature, nor frequency of operation is exceeded.

The tracking error of an electronic circuit element is defined as the deviation of a measured property under changing conditions, with respect to the deviation of the same property to the same changing conditions of a reference element. for example, a fractional change in resistance of a resistor of some nominal value can be measured under conditions of changing temperature. This change might be found to be linear and equal to one millionth of the nominal value per degree Centigrade ($10^{-6}/°C$) which is the temperature coefficient of the resistor. This temperature coefficient is then compared to the temperature coefficient of a reference resistor, or to a published reference value. If the two coefficients are the same, the resistor is said to track in temperature and has negligible tracking error with respect to the reference.

Since tracking error is based on a fractional change, two elements with different tolerances may track in temperature. Conversely, two elements with the same tolerances at a specific temperature may not track over a temperature range. Tracking error is similarly defined for tracking of variations in properties with other environmental conditions e.g., humidity, and for operational conditions e.g., frequency; voltage, etc.

Replica elements as used herein are circuit components which by virtue of the use of identical materials and methods in their manufacture have nearly identical electro-physical characteristics. The inherent property of such replica elements is tracking with respect to all environmental and operational conditions, therefore they have negligible tracking error with respect to each other. The tolerances of the electrical properties of replica elements are the same or very nearly the same. The tolerance of replica elements can be chosen depending on the specific need. For instance a small and controlled unbalance may be introduced in the replica elements of a replica bridge to achieve near balance of the bridge.

An example of replica elements would be two coils made on the same assembly line, using the same materials, and the same procedures, and trimmed for substantial electrical identity. For instance, a coil wound on a ferro-magnetic core will change its inductance with temperature because the permeability of the core varies with temperature. Thus, two Replica coils wound on ferro-magnetic cores will both vary in inductance in the same manner and amount and so their substantial identity will be maintained regardless of temperature. Each Replica element also responds similarly to operating conditions; continuing with the example of a coil, its impedance depends on the frequency, and also to some extent on the amplitude of the signal applied to its terminals. Here again two replica coils will track, and the substantial identity of their impedances will be maintained regardless of the operating conditions.

Referring now to FIG. 1, which illustrates a generalized bridge circuit, Equation (1) describes the conditions of generalized bridge balance and can be satisfied if $$Z_{fp} = Z_{fn} \text{ and } Z_{gn} = Z_{gp} \tag{2}$$

or $$Z_{fp} = Z_{gp} \text{ and } Z_{gn} = Z_{fn} \tag{3}$$

Figure 2:
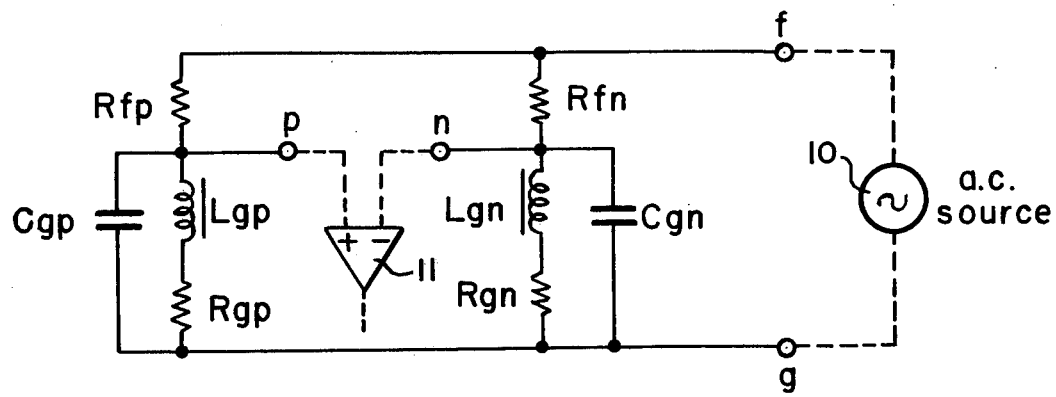
FIG. 2 illustrates a Replica Bridge and also shows an alternative embodiment open loop impedance unbalance indicator.

Equation (2) or Equation (3) define corresponding branches: When the bridge branch impedances in Equation (2) or Equation (3) are pairs of replica components the bridge has replica elements in corresponding branches and the chosen bridge balance will be maintained regardless of variation of environmental conditions or operating conditions. FIG. 2 illustrates a Replica Bridge, with the following element pairs being replicas of each other:

$$R_{fp} = R_{fn}, C_{gp} = C_{gn}, L_{gp} = L_{gn}, R_{gp} = R_{gn}$$

Figure 3:
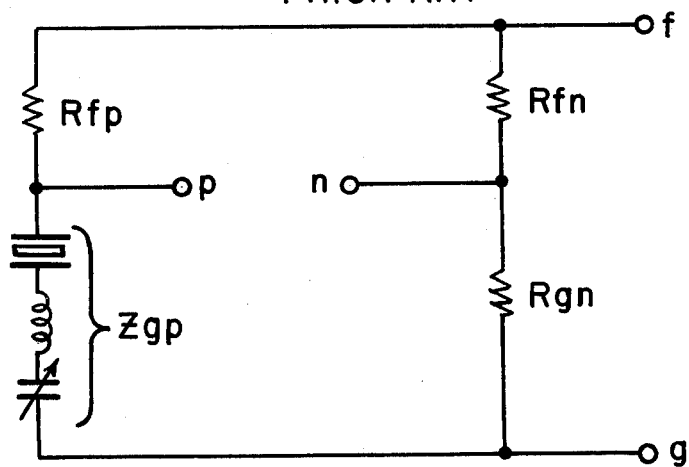
FIG. 3 illustrates a prior art Common Bridge.

In the other class of bridges, the Common bridge, the electrical impedances in Equation (1) balance only for a specific set of operational and environmental conditions. Practically all bridges in the prior art are of the Common variety. An example of a Common bridge is shown in FIG. 3. The resistors $R_{fp}$, $R_{fn}$ and $R_{gn}$ are equal. However, the impedance $Z_{gp}$ consists of an inductor, capacitor and a piezoelectric crystal and therefore the balance condition is obtained only at a very specific resonance frequency $\omega_r$ where $$Z_{gp}(\omega_r) = R_{gn} \tag{4}$$

The common bridge of FIG. 3 has often been used in oscillators of the prior art.

Figure 4:
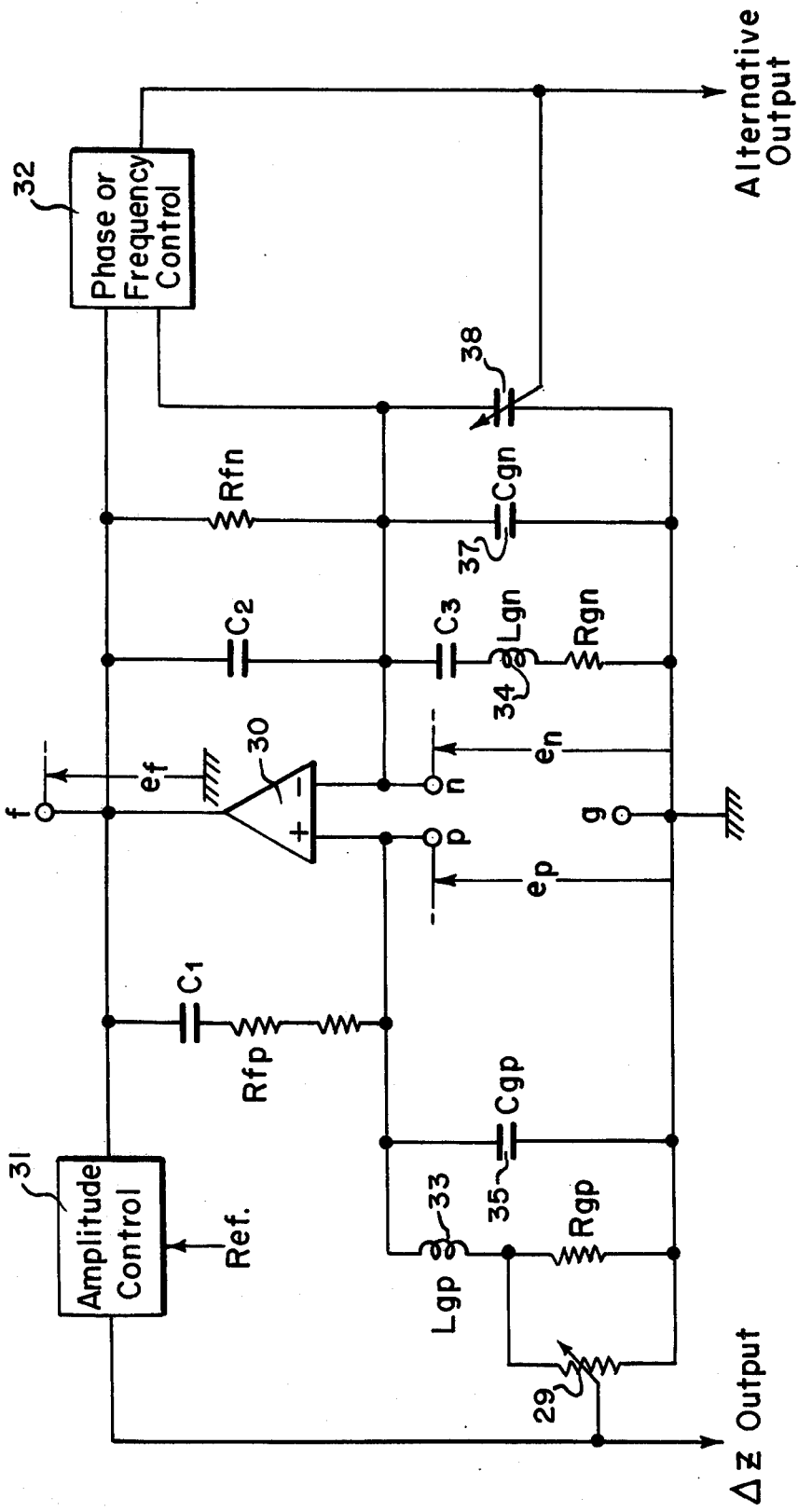
FIG. 4 is a block diagram of a Replica Bridge Oscillator (RBO) circuit of the invention.

Referring now to FIG. 4, there is shown a closed loop application of the replica bridge shown in FIG. 2, which is the Replica Bridge Oscillator (RBO) circuit of the preferred embodiment of the invention. The $p$ node and $n$ node are respectively connected to the non-inverting and inverting input terminals of an operational amplifier 30. The amplifier 30 may be a standard integrated circuit operational amplifier having a number of inputs and outputs in the same physical package, but is shown as having the two standard inputs and one output for simplicity. The $f$ node is connected to the amplifier output and $g$ node is connected to ground. The positive and negative feedback is thereby symmetrically provided by the corresponding replica branches of the bridge. Because of this symmetry and the negligible tracking error of replica elements the effects of any environmental or operational changes will cancel.

In the circuit of FIG. 4, the steady state oscillations are maintained if the attenuation of the Replica bridge is equal to the gain of the amplifier and the net phase shift around the loops is zero. At exact balance the bridge attenuation is infinite, and oscillation cannot be maintained. However, very near balance the conditions for oscillations are satisfied. In addition to the bridge circuit components of FIG. 2, and the operational amplifier 30, FIG. 4 contains two control loops and three compensatory capacitors $C_1$, $C_2$ and $C_3$. These additional elements do not change the essential operation of the Replica bridge in its operational frequency range i.e., 50kHz to 150kHz and will be discussed in detail hereinbelow. A Replica Bridge Oscillator operates over a large range of frequencies because the bridge attenuation and phase do not change appreciably with frequency, or with environmental and operational conditions. The dominant influence of the RBO behavior i.e., on its amplitude or frequency is an unbalance in replica impedances. Consequently, a Replica Bridge Oscillator (RBO) has excellent sensitivity to impedance unbalance while at the same time being relatively immune to changes of temperature, supply voltage, etc.

Returning to FIG. 4, the inverting node $n$ of the amplifier 30 is connected to the output terminal node $f$ through a parallel combination of $R_{fn}$ and $C_2$. Comparison with FIG. 2 shows that compensatory capacitor $C_2$ has been added. It has a very small capacitance and is used to provide a high frequency roll-off of the amplifier 30 in order to assure stable operation thereof and prevent undesired operation at very high frequency, i.e., 10 MHz. Compensatory capacitor $C_3$ has a large capacitance and has been added in series with the $L_{gn}$ branch to eliminate the DC offset of amplifier 30, without influencing the impedance of the bridge in the preferred operating frequency range. Compensatory capacitor $C_1$ connected in the $R_{fp}$ branch is used to prevent DC latch-up and very low frequency oscillations. Because of their functions, these three compensatory components may be more appropriately considered as parts of the amplifier 30, rather than elements of the Replica Bridge since they do not significantly influence the function of the bridge in the design range of frequencies.

The Amplitude stabilization for the RBO is accomplished by the amplitude control circuit 31. Typically circuit 31 consists of a peak detector which determines the peak amplitude of the output voltage from terminal node $f$. This peak amplitude is compared with a preset reference voltage, e.g., 8 volts. If the amplitude exceeds the reference, a control signal is generated which increases variable resistance 29 in parallel with bridge element $R_{gp}$, thereby decreasing the Q of the circuit consisting of coil 33, and the capacitor designated as $C_{gp}$. This decreases the output voltage of amplifier 30 and thereby counteracts the originally detected increase. The nonlinear, resistance 29 is typically the source-drain connection of a Field Effect Transistor (FET) with the control voltage applied to the gate. Once the RBO has stabilized, a signal will appear at the $\Delta Z$ output whenever the impedance of a replica element is changed thereby changing the attenuation of the replica bridge. This signal is used as the output of the RBO's in the preferred embodiment metal detector apparatus discussed hereinbelow.

Phase or frequency stabilization of the RBO is accomplished by phase or frequency control circuit 32. Typically circuit 32 consists of a peak detector which determines the peak amplitude of the input voltage $e_n$ to the inverting input of amplifier 30. This peak amplitude is compared with a predetermined fraction of the peak output voltage. If the amplitude exceeds this fraction, a control signal to a variable capacitor 38, which is parallel with the bridge capacitor designated $C_{gn}$, changes, thereby controlling the phase angle of frequency. Once the RBO has stabilized a signal change will also appear at the point marked alternative output whenever the impedance of a replica element is changed. Hence, this circuit provides an alternative signal for use in the metal detector apparatus described hereinbelow. It should be noted that the active phase control provided by circuit 32 is an optional refinement of the RBO circuit and is not necessary for proper operation of an RBO of the invention.

Figure 10:
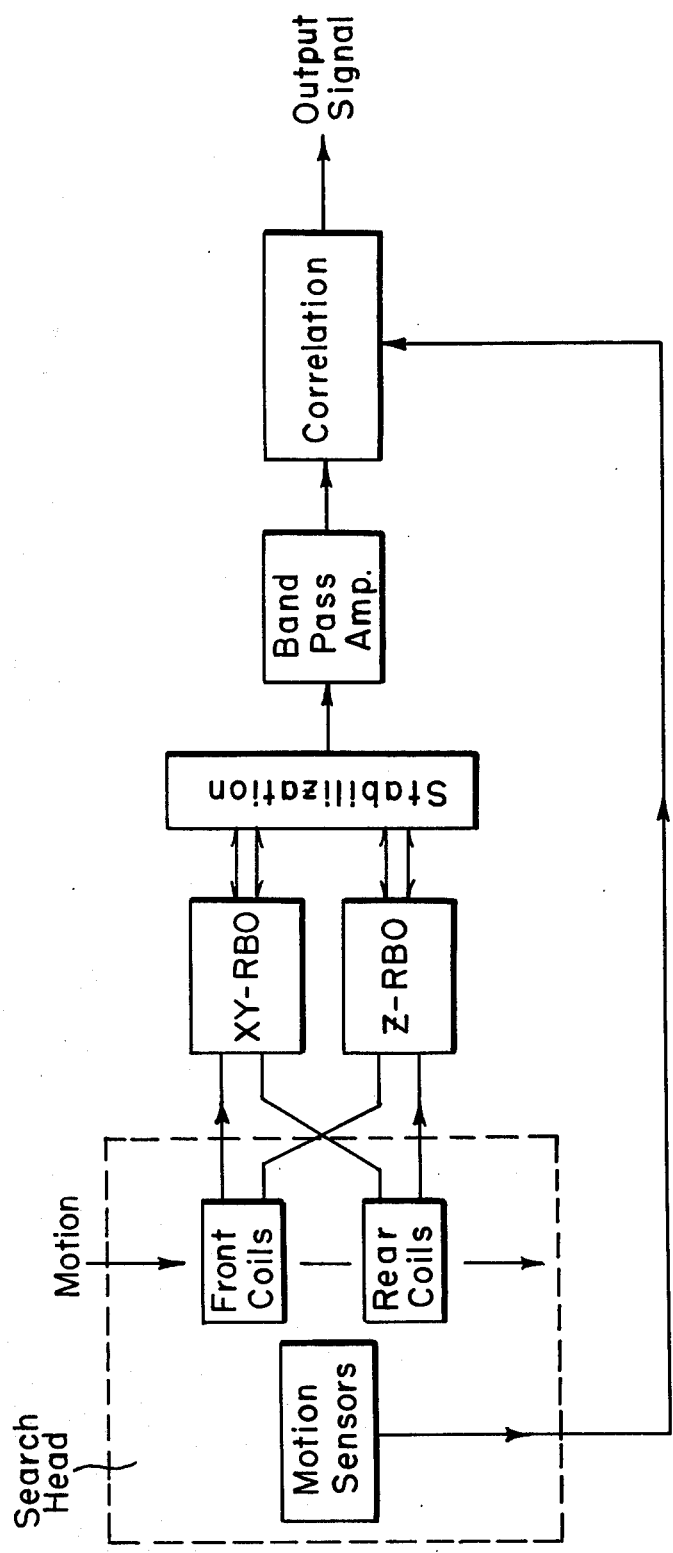
FIG. 10 is the block diagram of the apparatus of the preferred metal detector embodiment.

Referring now to FIG. 10, there is shown in block diagram form a preferred embodiment of a triaxial metal detector apparatus that utilizes two Replica Bridge Oscillators. Generally, relative motion is established between a product, which may contain tramp metal, and a search head. Any metal particles passing adjacent the replica coils, designated Front and Rear Coils, will cause a change in the impedance which generates a signal from the RBO stabilization circuit. The signal-to-noise ratio of this signal is improved by bandpass filtering and a correlation circuit resulting in an output signal indicating that metal has been detected.

The front and rear replica coils shown in FIG. 10 are the sensors of the metal detector apparatus. However, the operation of the RBO as a sensing circuit is not limited to the use of coils as sensors, any electronic sensor which responds to the phenomenon that it is intended to sense by modification of its electrical properties may be used. Thus with the use of appropriate replica sensor elements an RBO can be used in apparatus for proximity sensing, motion sensing, temperature sensing, etc. Replica sensor elements, of course, have the same tracking error and tolerance characteristics as do ordinary replica elements in addition to their sensing characteristics.

Figure 5:
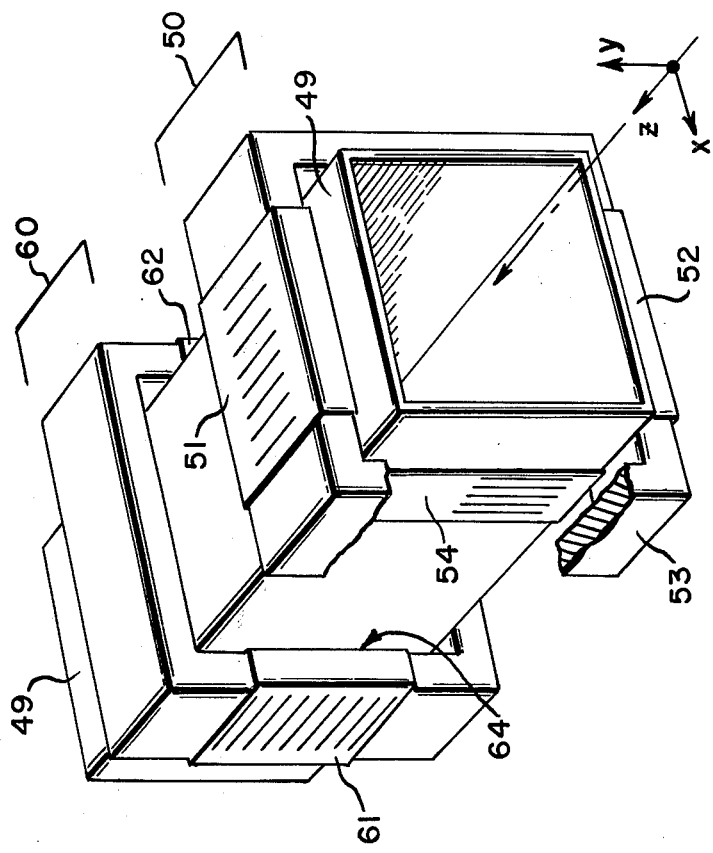
FIG. 5 illustrates the sensing head used in the apparatus of the invention.

Referring now to FIG. 5, there is shown the search head employed in the preferred embodiment. A tramp metal carrying product in its motion through the search head, travels, for example on a conveyor inside the rectangular fiberglass tube 49, which runs the full length of the search head. It passes through the front inductor assembly 50 and the rear inductor assembly 60 which serve as metal sensors. Top coil 51 and the bottom coil 52 of the front inductor are wound around the ferrite core 53. The axial coil 54 is wound around the fiberglass rectangular tube 49. Coil 54 is centered under core 53. Similarly axial coil 64 is wound around tube 49 centered under the core of coil assembly 60.

Inductor 60 is a replica of inductor 50. It is however rotated 90° around the axis so that the side coil 61 is equivalent to the top coil 51, and the other side coil 62 is equivalent to the bottom coil 52. Coils 51 and 52 are connected in parallel to form one replica element of an RBO, for example, element 33 designated $L_{gp}$ in FIG. 4. Similarly coils 61 and 62 are connected in parallel to form the corresponding replica element of an RBO, for example, element 34 designated $L_{gn}$ in FIG. 4. These coils are the replica sensor elements of the RBO sensing circuits in which they are connected.

Figure 6B:
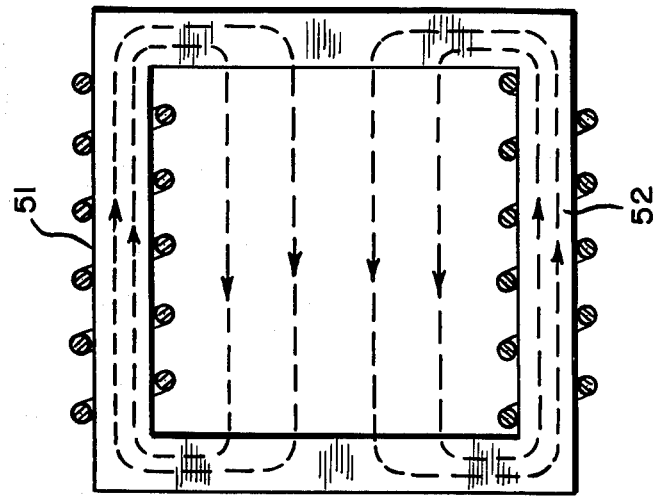
FIGS. 6A and 6B illustrate the magnetic search field configuration in the sensing head.
Figure 6A:
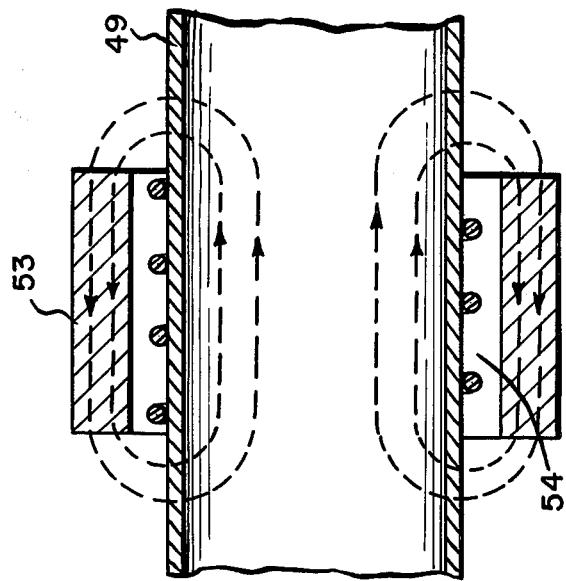

The magnetic search field resulting from equal signals in coils 51 and 52 in the front inductor assembly 60 is shown in FIG. 6A. It extends from right to left in the figure. This corresponds to the X direction of the coordinate system shown in FIG. 5, and therefore the parallel connection of coils 51 and 52 is designated as the X coil. Since coils 61 and 62 of the rear inductor assembly 60 are rotated 90° with respect to 51 and 52, they create a magnetic field (not shown) in the Y direction, and the parallel combination of 61 and 62 is designated as the Y coil.

The magnetic field created by the replica sensor coils 54 or 64 as shown in FIG. 6B extends in the Z direction in both front and rear coils. Coil 54 is therefore designated as $Z_F$ coil and 64 as $Z_R$ coil.

Two RBO circuits are used in conjunction with the triaxial metal detector shown in FIG. 10. The X coil and its replica Y coil are used in one RBO, designated the XY-RBO and the $Z_F$ and $Z_R$ coils are used in the other RBO designated the Z-RBO.

In theory the two RBO's can be entirely separate: the Z coil is wound at right angles to the X and Y coils and therefore the magnetic fluxes should not cross-couple. In practice, however, there is a small amount of cross-coupling which must be taken into consideration in the design of the system. In the preferred embodiment the XY-RBO and the Z-RBO operate at the same frequency and the cross-coupling is used to lock the frequency of the two oscillators.

As will be explained in conjunction with FIG. 7, the coil current in the X and $Z_F$ coils, and the Y and $Z_R$ coils are approximately 90° out of phase. The result of this 90° phase shift is a rotating magnetic field vector in X Z plane in the front coil assembly and in the Y Z plane in the rear coil assembly. A metallic particle in a product traveling through the search head will therefore be detected in the near optimal direction of the magnetic search field regardless of particle orientation.

Analysis of the RBO of circuit 4, using the notation of FIG. 1 shows that the input voltage $e_p$ at terminal node $p$ is:

$$e_p/e_f = (a_p + jb_p) - 1 \qquad (5)$$

where $$a_p = 1 + Re(Z_{fp} Y_{gp}) \qquad (6)$$

and $$b_p = Im(Z_{fp} Y_{gp}) \qquad (7)$$

In polar coordinates the magnitude of $e_p$ is:

$$|e_p/e_f| = (a_p^2 + b_p^2)^{-1/2} \qquad (8)$$

and the phase angle between $e_p$ and $e_f$ is:

$$\theta_p = \arctan(b_p/a_p) \qquad (9)$$

The quantity $a_p$ is substantially constant with frequency, whereas $b_p$ varies with frequency. A conformal transformation of the expression in the parenthesis in Equation (5) leads to a circular $e_p$ vector locus shown in FIG. 7. As frequency changes the vector $e_p$ always terminates on the circle OPR.

The expression for the input voltage $e_n$ at terminal node $n$ can be obtained by replacing the subscript $p$ by the subscript $n$ in Equations (5) to (9). The locus of $e_n$ is also a circle shown in FIG. 7 as ONR.

The amplifier 30 used in the preferred embodiment of the RBO introduces a 90° phase shift between the input and the output. Consequently in order to satisfy the conditions of oscillation the difference of the input voltages $e_p - e_n$ is a small vector rotated 90° with respect to the output voltage $e_f$, and has a magnitude $$e_p - e_n = + e_f/A \qquad (10)$$

Figure 7:
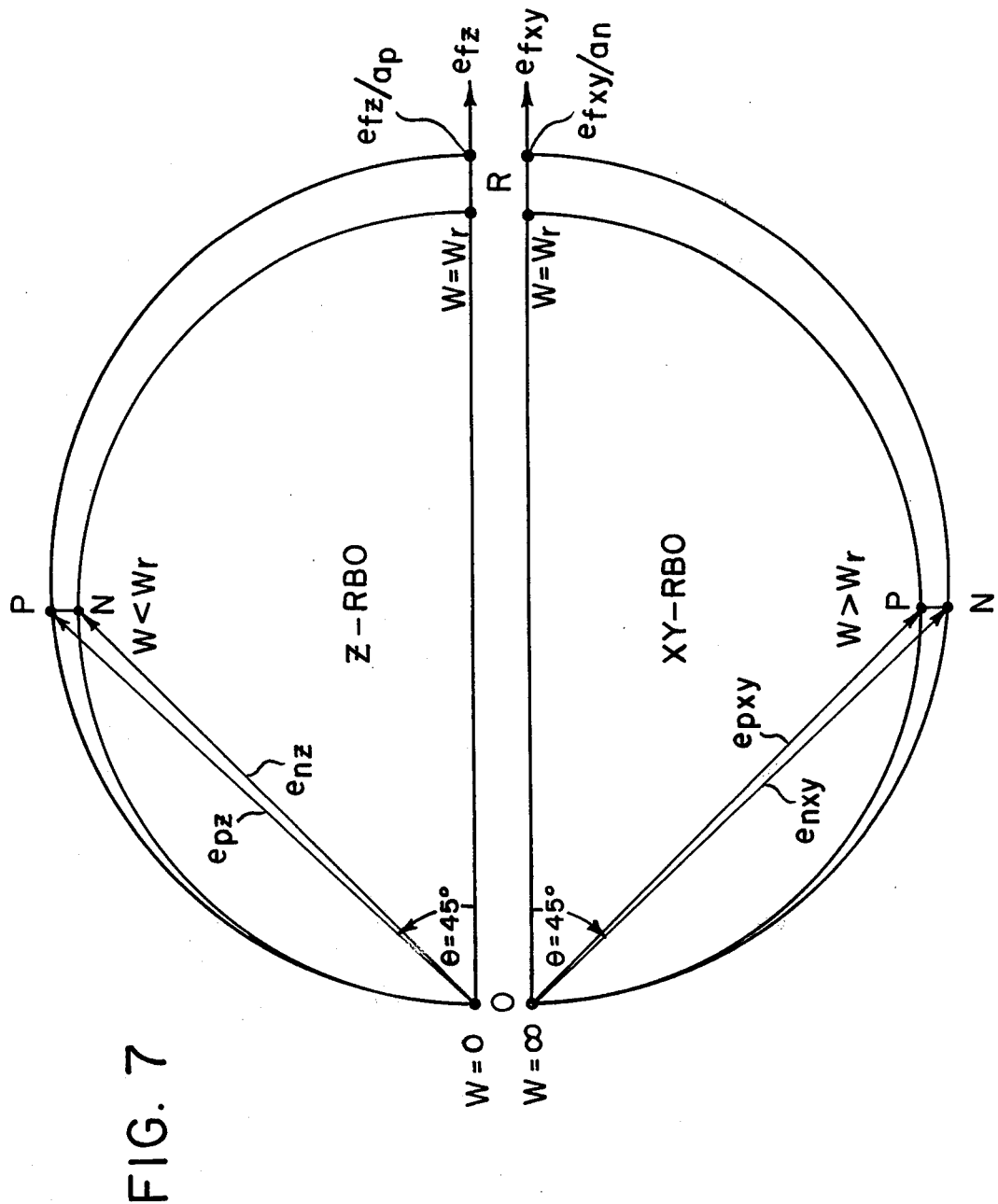
FIG. 7 is a vector diagram of RBO voltages.

FIG. 7 represents a convenient "map" of the operation of the RBO. Specifically it can be seen that the oscillator can work over a large range of frequencies and phases. This is in sharp contrast to Common bridge oscillators where oscillation is only possible in the immediate vicinity of the impedance equivalence frequency.

The resonance frequencies of the $p$ and $n$ branches of the bridge are:

$$\omega_{rp} = 1/\sqrt{L_{gp} C_{gp}};\; \omega_{rn} = 1/\sqrt{L_{gn} C_{gn}} \qquad (11)$$

Good performance of an RBO used for metal particle detection is obtained when the two resonance frequencies are nearly equal and the phase angle $\theta$ between input and output is approximately $\theta = -45°$, corresponding to the operation below resonance (upper semi-circle of FIG. 7), or $\theta = -45°$, corresponding to the operation above resonance. (Lower semi-circle of FIG. 7). In the preferred embodiment the Z-RBO operates at $-45°$ below resonance and the XY-RBO operates at $+45°$ above resonance, and the output frequencies of both RBO's are locked in by the residual cross-coupling in the XZ and YZ coils referred to above. By proper choice of component values the phases of the output signals of the XY-RBO and Z-RBO are approximately equal. The choice of these conditions is not critical, although it is desirable for the phase between $e_{nxy}$ and $e_{nz}$ and between $e_{pxy}$ and $e_{pz}$ to be close to 90°. These conditions of quadrature assure rotating magnetic fields in the XZ and YZ planes. As was discussed in conjunction with FIGS. 5, 6A and 6B, this corresponds to a effective triaxial magnetic search field in the search head.

Figure 8:
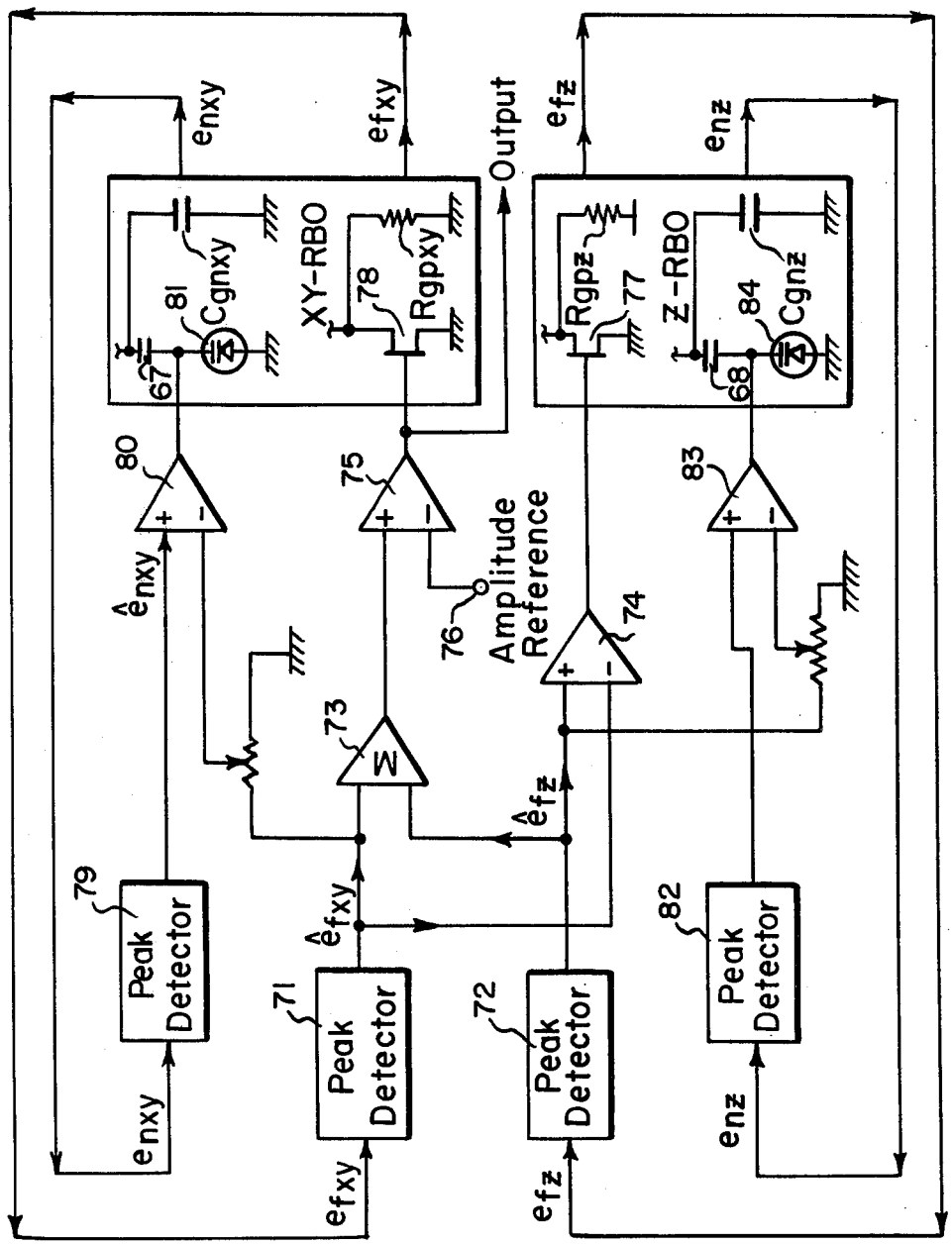
FIG. 8 illustrates the amplitude and phase stabilization circuit for the two RBO's in the metal detector embodiment of the invention.

FIG. 8 shows the block diagram of the circuit used to stabilize the amplitude and phase of the two RBO's used for the metal detector of FIG. 10. The output voltages, $e_{fxy}$ of the XY-RBO and $e_{fz}$ of the Z-RBO are applied to peak detectors 71 and 72 respectively. The peak voltages $\hat{e}_{fxy}$ and $\hat{e}_{fz}$, generated by the peak detectors, are applied to the summing amplifier 73 and the differential amplifier 74. The output from the summing amplifier 73 is applied to one input terminal of a comparator 75, the other input terminal of 75 is connected to a reference voltage 76. If the sum of the peak amplitudes of $\hat{e}_{fxy}$ and $\hat{e}_{fz}$ is lower than the reference 76, the control voltage for FET 78, a component such as 29 shown in FIG. 4, changes so that its resistance is lowered. The value of replica resistance $R_{gpxy}$ is thereby effectively lowered, and $e_{fxy}$ is therefore increased. This increase unbalances the inputs to the differential amplifier 74 thereby producing a control voltage for FET 77 that effectively lowers the resistance of $R_{gpz}$ and causes a corresponding increase in $e_{fz}$. This increase in the amplitudes of $\hat{e}_{fxy}$ and $\hat{e}_{fz}$ continues until their sum is equal to the reference value 76, and their difference is equal to zero i.e., they are unbalanced and the RBO's are stabilized.

The stabilization of phase between the input voltage $e_n$ and the output voltage $e_f$ is accomplished, as shown in FIG. 8, by identical circuits for both the XY-RBO and Z-RBO. The voltage from the inverting input terminal $e_{nxy}$ is applied to the peak detector 79 and the output of 79, $\hat{e}_{nxy}$, is compared with a fraction of the output voltage $\hat{e}_{fxy}$ by differential amplifier 80. The reference fraction is chosen so that the desired 45° phase angle corresponds to equal inputs at the differential amplifier 80. Any unbalance at the inputs to 80 changes the control voltage to the varactor 81, a component such as 38 shown in FIG. 4, changing its value. The value of replica capacitor $C_{gnxy}$ is thereby effectively changed restoring the desired phase angle.

Referring again to FIG. 7, it can be seen that the input voltage $e_p$ inherently tracks voltage $e_n$ in both RBO's when operating close to 45° and therefore only the phase of $e_n$ need be controlled. The difference between $e_p$ and $e_n$ is a small voltage at right angles to $e_f$. Therefore $e_p$ is approximately equal to $e_n$ both in phase and in amplitude. Since the tip of $e_n$ is always on the circle ONR it can be seen that the magnitude of $e_n$ depends on its angle. The smaller the angle the larger $e_n$. Hence, monitoring the amplitude controls the angle. A similar analysis applies to the stabilization of phase for the Z-RBO where peak detector 82 corresponds to 79, differential amplifier 83 corresponds to 80 and varactor 84 corresponds to 81. The d.c. blocking capacitors 67 and 68 are required for proper operation of the varactors 81 and 84 and do not effect the operation of the replica bridge in the design frequency range. It should be also pointed out that the frequency of oscillation changes with angle, and therefore an alternative method of phase control is by monitoring the frequency with a frequency discriminator circuit for generation of the control signal for varactors 81 and 84. The control signals of varactors 81 and 84 and the control signals of the FET's 78 and 77 can be used alone or in any combination to produce an indication of passage of a tramp metal particle through the search head of the detector. FIG. 8 shows an output taken from the FET 78 control, which is used in the metal detector of the preferred embodiment.

The frequency spectrum distribution of the metal particle signal obtained from the RBO depends on the speed of passage through the search head. Quite often this speed is very well defined e.g., when a tramp metal particle is in a non-metallic product moving on a conveyor belt through the head. The useful frequency spectrum is then well defined and an improvement in the signal-to-noise ratio can be realized by using a properly chosen ordinary band-pass amplifier to amplify only this useful frequency band while rejecting the rest of the spectrum. Such a band-pass amplifier is shown in the block diagram of the system in FIG. 10.

Figure 9:
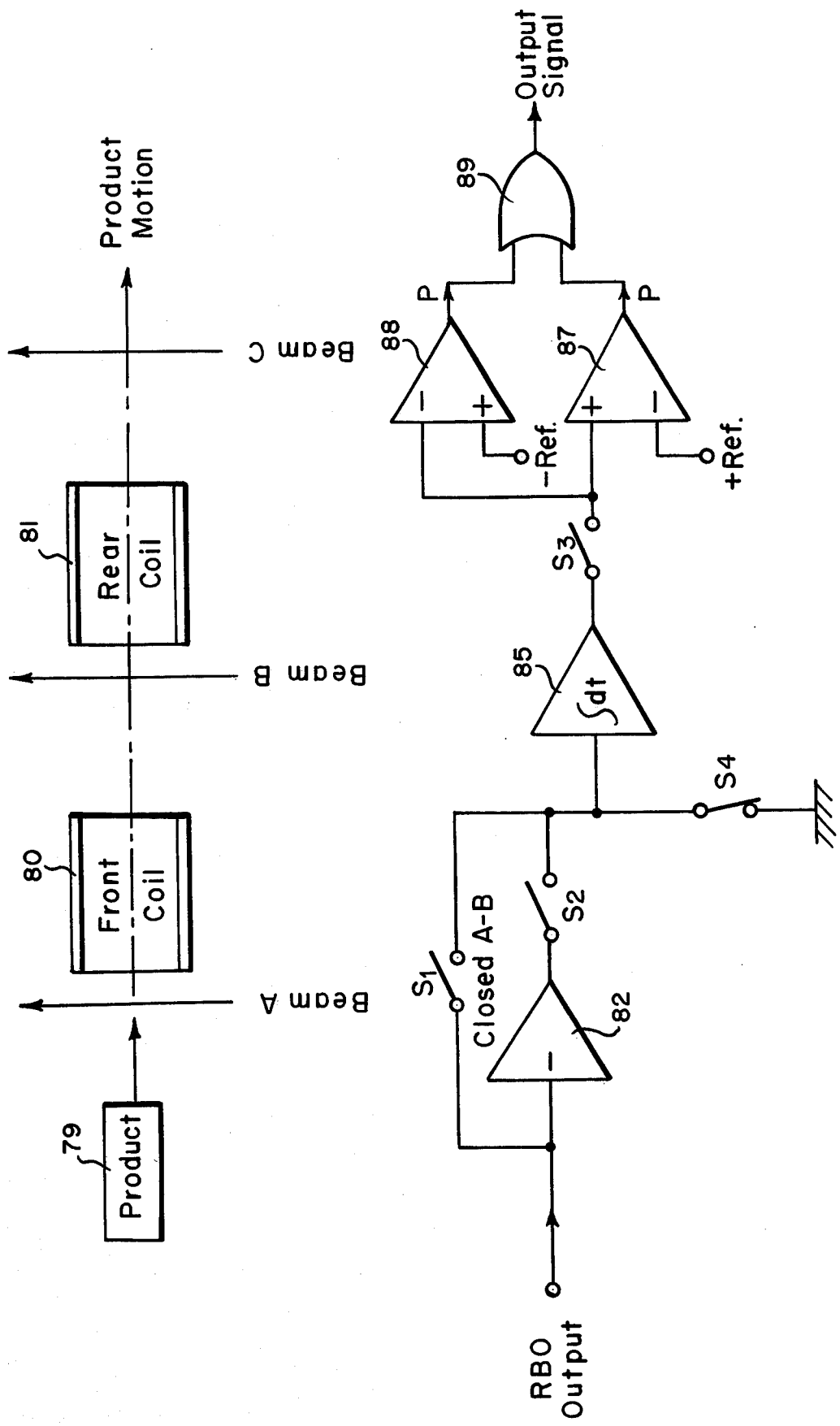
FIG. 9 illustrates the correlation circuit of the metal detector embodiment of the invention.

Further improvement of the signal-to-noise ratio is obtained by monitoring the motion of the metal particle carrying non-metallic object through the search head and by correlating the particle position with the RBO output signal. Referring now to FIG. 9, there is shown diagrammatically the motion of a product through a search head of the type shown in FIG. 5. Beams A, B, and C represent an appropriate light activated interrupter device for providing a signal indicating the presence of the product at various points along its path through the search head. Any of the well-known photoelectric devices may be used. There is also shown in block form a circuit that utilizes the signals from those devices to improve the signal-to-noise ratio of the triaxial metal detector of the preferred embodiment. On entry into the front coil 50 the product interrupts light beam A causing switch S4 to open and switch S1 to close. Interruption of beam B corresponds to the exit of the product from the front coil and its entry into the rear coil 60. This interruption causes S1 to open and switch S2 to close. A magnetic tramp metal particle in the product causes a positive output while under the front coil and a negative output while under the rear coil. During the time interval between A and B, only switch S1 is closed, therefore the positive output is integrated by the integrator circuit 85. During the time interval corresponding to the passage of the particle through the rear coil as registered by the time between the interruption of beam B but before the interruption of beam C only switch S2 is closed. The negative signal from the RBO is inverted by the amplifier 86 and the cumulative positive integration by integrator 85 continues. When beam C is interrupted, switch S2 is open and switch S3 is closed. If the output transmitted through the closed switch S3 exceeds a specified positive reference level, a positive pulse, is generated by the comparator 87. Finally, when interruption of beam C ceases, S3 is opened and S4 is closed thereby resetting integrator 85 in preparation for the next interruption of beam A.

Non-magnetic tramp metal particles cause outputs which are opposite in polarity to those produced by magnetic particles. It is usually desired to detect both magnetic and non-magnetic tramp metal and so another comparator 88 is used. Since the interconnection of inputs of 88 is reversed, comparator 88 produces a positive pulse if signal through S3 is more negative than −REF. Outputs from comparator 87 and 88 are applied to an OR gate 89, which produces a positive output signal indicating the passage of a metal particle through the sensing coils. The output signal can be used for a number of purposes, for example, to activate a product reject mechanism.

Referring now to FIG. 2, there is shown by the dashed line connections an alternative application of the replica bridge network as an impedance unbalance sensing circuit. An output of a conventional oscillator 10 is supplied to terminal nodes $fg$. The bridge is balanced i.e., the voltage between nodes $pn$ is close to zero. An input of a differential amplifier 11 is connected to terminal nodes $pn$. When in a process of sensing one of the branch impedances of the bridge is disturbed, a voltage will appear at terminal nodes $pn$. This voltage will be amplified by the differential amplifier 11 and will serve as an output indication of the sensed phenomenon. This use of a balanced replica bridge is an open loop operation as distinguished from the oscillator (closed loop) operation described hereinabove. Such an open loop operation requires maintenance of careful bridge balance since an unbalance voltage tends to saturate amplifier 11. The necessary allowance for an unbalance limits the useful gain of amplifier 11 which in turn determines the threshold of useful detection. The preferred embodiment replica bridge oscillator sensing circuit described herein is of course not so limited.

The foregoing description of the Replica Bridge Oscillator sensing circuit and its use in a triaxial tramp metal detector apparatus constitutes the preferred embodiment of the invention. However, many equivalent alternative embodiments will be clear to those skilled in the art, for example, three RBO's may be used in a triaxial metal detector, one each in conjunction with front and rear coil pairs for each axis. The RBO's may operate at differing frequencies. Coil configurations other than those described in connection with the preferred embodiment can be used to create the magnetic search field. For example, coils 54 and 64 may be replaced by two additional windings on each of cores 53 and 63. The axes of the cores in this instance are at ±45° angles with the tube 49 and at 90° to each other. It is also clear that the replica sensing elements are not restricted to the corresponding branches as shown and that replica resistive, capacitive or combined impedance sensor elements may be used as well as the inductive sensor elements described. The variable resistive element which in the preferred embodiment is an FET can also be a thermistor, photoconductive optical coupler or any element that varies in resistance directly or indirectly with the amplitude of oscillations. Any such Replica Bridge Oscillator is capable of operation over a large range of frequencies, has high sensitivity to impedance unbalance in the replica elements and is extremely tolerant of changes in environmental conditions such as temperature, humidity, shock, vibration, etc., as well as changes in operating conditions such as supply voltage, etc.

In addition the preferred embodiment utilizes replica bridge circuits with nominal element tolerances chosen for near balanced operation so that the necessary nominal conditions for oscillation exist. This element difference is preferably quite small and in the preferred embodiment is on the order of one part in fifty thousand. The circuit of FIG. 4 may also be operated with a balanced replica bridge in which case under nominal conditions there are no oscillations. However, a change in the impedance of a replica sensor element in the bridge will cause oscillations which will produce an output signal in a similar manner to that described for near balanced operations.

I claim:
1. A sensing circuit comprising:
   a. amplifier means having at least two inputs, and at least one output;
   b. a bridge network having replica elements in corresponding branches;
   c. said bridge network connected symmetrically between a source of alternating current and at least two of the inputs of said amplifier; and
   d. means responsive to a change in attenuation of said bridge network for producing a signal connected to said amplifier.
2. An oscillator sensing circuit comprising:
   a. amplifier means having at least two inputs and at least one output;
   b. a near balanced bridge network having replica elements in corresponding branches;
   c. the nodes of said bridge network connected symmetrically between an output and at least two inputs of said amplifier; and
   d. means responsive to a change in attenuation of said bridge network for producing a signal connected to said amplifier.
3. The oscillator of claim 2 wherein at least one of said replica elements is a sensor that responds by changing its impedance.
4. A sensing circuit comprising:
   a. amplifier means having an inverting input, a non-inverting input, and at least one output;
   b. a bridge network having replica elements in corresponding branches;
   c. the nodes of said bridge network connected symmetrically between an output and said inputs of said amplifier;
   d. means responsive to a change in attenuation of said bridge network for producing a signal connected to said amplifier;
   e. stabilizing means for modifying the impedance of an element of said bridge; and
   f. said stabilizing means controlled by said signal for maintaining a predetermined output amplitude of said amplifier.

5. The sensing circuit of claim 4 wherein said stabilizing means is a field effect transistor.

6. The sensing circuit of claim 4 wherein at least one of said replica elements is a sensor that responds by changing its impedance.

7. The sensing circuit of claim 4 further comprising: additional stabilizing means for modifying the impedance of another element of said bridge; and means controlling said additional stabilizing means for maintaining a predetermined phase relationship between said inputs and said output of said amplifier.

8. The sensing circuit of claim 7 wherein said additional stabilizing means is a varactor diode.

9. A sensing circuit comprising:
   a. amplifier means having an inverting input, a non-inverting input, and at least one output;
   b. a near balanced bridge network having replica elements in corresponding branches;
   c. the nodes of said bridge network connected symmetrically between an output and said inputs of said amplifier;
   d. means responsive to a change in attenuation of said bridge network for producing a signal connected to said amplifier; and
   e. compensatory means for preventing instabilities at the extremes of the frequency response of said amplifier whereby, when energized, said amplifier produces oscillations at its output within a predetermined frequency range.

10. The sensing circuit of claim 9 wherein at least one of said replica elements is a sensor that responds by changing its impedance.

11. A multiaxial metal detecting apparatus comprising:
   a. at least two replica inductors for producing magnetic fields in different directions;
   b. a Replica Bridge Oscillator circuit having at least one of said inductors as an element in a branch of its replica bridge;
   c. another Replica Bridge Oscillator circuit having at least one other of said inductors as an element in a branch of its replica bridge;
   d. output means connected to the amplifier of at least one of said Replica Bridge Oscillator circuits for producing an output signal when metal causes a change of impedance in any of said inductors.

12. The metal detector of claim 11 and further comprising:
   a. means for moving material adjacent said inductors; and
   b. said inductors placed successively with respect to the motion of said material.

13. The metal detector of claim 11 and further comprising means connected to the outputs of the amplifiers of said Replica Bridge Oscillators for stabilizing the outut amplitude of said amplifiers in the presence of cross-sampling between said oscillators.

14. The metal detector of claim 12 and further comprising means indicating the position of the material with respect to said inductors for producing correlating signals, means controlled by said correlating signals for integrating said output signal whereby the signal-to-noise ratio of said output signal is increased.

* * * * *

UNITED STATES PATENT AND TRADEMARK OFFICE
CERTIFICATE OF CORRECTION

PATENT NO. : 4,038,609
DATED : July 26, 1977
INVENTOR(S) : Edwin Langberg

It is certified that error appears in the above-identified patent and that said Letters Patent are hereby corrected as shown below:

Column 4, line 28, ".for example" should read --. For example--.

Column 5, line 65, ",the steady" should read --, steady--.

Column 9, line 57, "are unbalanced" should read --are balanced--.

Column 14, line 24, "outut" should read --output--.

Column 14, line 25, "cross-sampling" should read --cross-coupling--.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*